United States Patent
Shen

(10) Patent No.: US 9,934,192 B2
(45) Date of Patent: *Apr. 3, 2018

(54) PERIPHERAL COMPONENT INTERCONNECT EXPRESS (PCIE) HOSTS ADAPTED TO SUPPORT REMOTE PCIE ENDPOINTS

(71) Applicant: QUALCOMM Incorporated, San Diego, CA (US)

(72) Inventor: Jian Shen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/631,927

(22) Filed: Jun. 23, 2017

(65) Prior Publication Data

US 2017/0286355 A1  Oct. 5, 2017

Related U.S. Application Data

(63) Continuation of application No. 14/598,300, filed on Jan. 16, 2015, now Pat. No. 9,690,738.

(51) Int. Cl.
*G06F 13/00* (2006.01)
*G06F 13/12* (2006.01)
(Continued)

(52) U.S. Cl.
CPC ........ *G06F 13/4282* (2013.01); *G06F 13/385* (2013.01); *G06F 2213/0026* (2013.01)

(58) Field of Classification Search
None
See application file for complete search history.

(56) References Cited

U.S. PATENT DOCUMENTS 5,191,653 A    3/1993  Banks et al.
6,952,753 B2  10/2005  Ralphs
(Continued)

FOREIGN PATENT DOCUMENTS

WO    2009012426 A2    1/2009

OTHER PUBLICATIONS

Author Unknown, "PCI Express Base Specification Revision 1.0," PCI Express, PCI-SIG, Apr. 29, 2002, pp. 1-8, 27-34, 180-184, 198-200.
(Continued)

*Primary Examiner* — David E Martinez
(74) *Attorney, Agent, or Firm* — Withrow & Terranova, PLLC

(57) ABSTRACT

Aspects disclosed in the detailed description include peripheral component interconnect express (PCIe) hosts adapted to support remote PCIe endpoints. In this regard, a PCIe host is configured to determine a temporal distance to an attached PCIe endpoint and compare the temporal distance to a predetermined threshold value. In one aspect, the PCIe host defines a first configuration parameter for the attached PCIe endpoint if the temporal distance is greater than the predetermined threshold value. In another aspect, the PCIe host defines a second configuration parameter different from the first configuration parameter for the attached PCIe endpoint if the temporal distance is less than or equal to the predetermined threshold value. By differentiating the attached PCIe endpoints based on temporal distances, the PCIe host can support compatibly a plurality of attached PCIe endpoints regardless of physical connection distances with the attached PCIe endpoints.

10 Claims, 5 Drawing Sheets

(51) Int. Cl.
  *G06F 3/00* (2006.01)
  *G06F 13/42* (2006.01)
  *G06F 13/38* (2006.01)

(56) References Cited

U.S. PATENT DOCUMENTS

| | | |
|---|---|---|
| 8,407,530 B2 | 3/2013 | Balasubramanyan et al. |
| 8,566,625 B2 | 10/2013 | Gobriel et al. |
| 9,690,738 B2 | 6/2017 | Shen |
| 2006/0277447 A1 | 12/2006 | Martin et al. |
| 2009/0024782 A1* | 1/2009 | Elboim ............... G06F 13/4059 710/313 |
| 2013/0145049 A1* | 6/2013 | Stanton .................... G06F 1/14 709/248 |
| 2013/0185472 A1 | 7/2013 | Elboim et al. |
| 2016/0210258 A1 | 7/2016 | Shen |

OTHER PUBLICATIONS

International Search Report and Written Opinion for PCT/US2015/064908, dated Mar. 29, 2016, 11 pages.
Second Written Opinion for PCT/US2015/064908, dated Dec. 21, 2016, 5 pages.
International Preliminary Report on Patentability for PCT/US2015/064908, dated May 15, 2017, 16 pages.

* cited by examiner

PERIPHERAL COMPONENT INTERCONNECT EXPRESS (PCIE) HOSTS ADAPTED TO SUPPORT REMOTE PCIE ENDPOINTS

PRIORITY CLAIM

The present application claims priority to and is a continuation of U.S. patent application Ser. No. 14/598,300 filed on Jan. 16, 2015 and entitled "PERIPHERAL COMPONENT INTERCONNECT EXPRESS (PCIe) HOSTS ADAPTED TO SUPPORT REMOTE PCIe ENDPOINTS," now U.S. Pat. No. 9,690,738, the contents of which is incorporated herein by reference in its entirety.

BACKGROUND

I. Field of the Disclosure

The technology of the disclosure relates generally to a peripheral component interconnect express (PCIe).

II. Background

Mobile communication devices have become increasingly common in current society. The prevalence of these mobile communication devices is driven in part by the many functions that are now enabled on such devices. Demand for such functions increases processing capability requirements for the mobile communication devices. As a result, the mobile communication devices have evolved from being pure communication tools to becoming sophisticated mobile entertainment centers.

Concurrent with the rise in popularity of mobile communication devices is the explosive growth of high-definition (HD) and ultra-HD (UHD) multimedia content generated and/or consumed by the mobile communication devices. However, the ability to view HD and UHD multimedia content on the mobile communication devices is hampered by relatively small screens of the mobile communication devices. In an effort to overcome limitations of the small screens and improve multimedia experiences for end users, wireless display technologies, such as wireless-fidelity (Wi-Fi) Miracast™, have been developed to enable viewing of the HD and UHD multimedia content on a remote display device over a Wi-Fi connection. However, lossy compression must be applied to the HD and UHD multimedia content prior to transmission over the Wi-Fi connection, which may adversely impact viewing quality of the HD and UHD multimedia content on the remote display device.

Various protocols have been proposed to help reduce this adverse impact on the viewing quality on remote display devices. In particular, mobile Peripheral Component Interconnect express (PCIe) is a PCI special interest group (SIG) (PCI-SIG) protocol designed to provide high-speed chip-to-chip interconnections inside the mobile communication devices. The mobile PCIe protocol is based on the MIPI® Alliance M-PHY® physical layer specification and can provide up to a 32 gigabit-per-second (Gbps) data transmission bandwidth. Various mobile communication devices are beginning to implement the mobile PCIe protocol to display uncompressed HD and UHD multimedia content on the remote display device over a PCIe connection for improved viewing quality. However, use of the mobile PCIe protocol over the PCIe connection in this context may generate transmission errors because transmitters waiting for acknowledge signals from the remote display device may time out before receiving such acknowledgment signals. Therefore, designers need additional tools to prevent such transmission errors.

SUMMARY OF THE DISCLOSURE

Aspects disclosed in the detailed description include peripheral component interconnect express (PCIe) hosts adapted to support remote PCIe endpoints. In this regard, a PCIe host is configured to determine a temporal distance to an attached PCIe endpoint and compare the temporal distance to a predetermined threshold value. In one aspect, the PCIe host defines a first configuration parameter for the attached PCIe endpoint if the temporal distance is greater than the predetermined threshold value. In another aspect, the PCIe host defines a second configuration parameter different from the first configuration parameter for the attached PCIe endpoint if the temporal distance is less than or equal to the predetermined threshold value. By differentiating the attached PCIe endpoints based on temporal distances, the PCIe host can support compatibly a plurality of attached PCIe endpoints regardless of physical connection distances with the plurality of attached PCIe endpoints.

In this regard in one aspect, a PCIe host is provided. The PCIe host comprises one or more connection slots configured to be coupled communicatively to one or more PCIe endpoints, respectively. The PCIe host also comprises a PCIe link controller communicatively coupled to the one or more connection slots. The PCIe link controller is configured to detect an attached PCIe endpoint on a connection slot among the one or more connection slots. The PCIe link controller is also configured to determine a temporal distance between the PCIe host and the attached PCIe endpoint. If the temporal distance is greater than a predetermined threshold value, the PCIe link controller is configured to determine the attached PCIe endpoint as a first type of PCIe endpoint. If the temporal distance is greater than the predetermined threshold value, the PCIe link controller is also configured to define a first configuration parameter to be provided to the first type of PCIe endpoint. If the temporal distance is less than or equal to the predetermined threshold value, the PCIe link controller is configured to determine the attached PCIe endpoint as a second type of PCIe endpoint. If the temporal distance is less than or equal to the predetermined threshold value, the PCIe link controller is also configured to define a second configuration parameter, which is different from the first configuration parameter, to be provided to the second type of PCIe endpoint.

In another aspect, a PCIe host is provided. The PCIe host comprises a means for communicatively coupling one or more PCIe endpoints. The PCIe host also comprises a means for controlling a PCIe link communicatively coupled to the means for communicatively coupling the one or more PCIe endpoints. The means for controlling the PCIe link is configured to detect an attached PCIe endpoint on the means for communicatively coupling the one or more PCIe endpoints. The means for controlling the PCIe link is also configured to determine a temporal distance between the PCIe host and the attached PCIe endpoint. If the temporal distance is greater than a predetermined threshold value, the means for controlling the PCIe link is configured to determine the attached PCIe endpoint as a first type of PCIe endpoint. If the temporal distance is greater than the predetermined threshold value, the means for controlling the PCIe link is also configured to define a first configuration parameter to be provided to the first type of PCIe endpoint. If the temporal distance is less than or equal to the predetermined threshold value, the means for controlling the PCIe link is configured to determine the attached PCIe endpoint as a second type of PCIe endpoint. If the temporal distance is less than or equal to the predetermined threshold value, the means for controlling the PCIe link is also configured to define a second configuration parameter to be provided to the second type of PCIe endpoint.

In another aspect, a method for supporting a remote PCIe endpoint at a PCIe host is provided. The method comprises detecting an attached PCIe endpoint on a connection slot among one or more connection slots. The method also comprises determining a temporal distance between the PCIe host and the attached PCIe endpoint. The method also comprises defining a first timeout value if the temporal distance is greater than a predetermined threshold value. The method also comprises defining a second timeout value shorter than the first timeout value if the temporal distance is less than or equal to the predetermined threshold value.

In another aspect, a PCIe host is provided. The PCIe host comprises one or more connection slots configured to be coupled communicatively to one or more PCIe endpoints, respectively. The PCIe host also comprises a PCIe link controller communicatively coupled to the one or more connection slots. The PCIe link controller is configured to detect an attached PCIe endpoint on a connection slot among the one or more connection slots. The PCIe link controller is also configured to determine a temporal distance between the PCIe host and the attached PCIe endpoint. If the temporal distance is greater than a predetermined threshold value, the PCIe link controller is configured to determine the attached PCIe endpoint as a remote PCIe endpoint. If the temporal distance is greater than the predetermined threshold value, the PCIe link controller is also configured to define a first timeout value to be provided to the remote PCIe endpoint. If the temporal distance is less than or equal to the predetermined threshold value, the PCIe link controller is configured to determine the attached PCIe endpoint as a local PCIe endpoint. If the temporal distance is less than or equal to the predetermined threshold value, the PCIe link controller is also configured to define a second timeout value, which is shorter than the first timeout value, to be provided to the local PCIe endpoint.

In another aspect, a PCIe host is provided. The PCIe host includes one or more connection slots configured to be coupled communicatively to one or more PCIe endpoints, respectively. The PCIe host also includes a PCIe link controller communicatively coupled to the one or more connection slots. The PCIe link controller is configured to detect an attached PCIe endpoint on a connection slot among the one or more connection slots. The PCIe link controller is also configured to determine a temporal distance between the PCIe host and the attached PCIe endpoint by measuring a round-trip time of a PCIe flow control packet. When the temporal distance is greater than a predetermined threshold value, the PCIe link controller is configured to determine the attached PCIe endpoint as a first type of PCIe endpoint and define a first configuration parameter to be provided to the first type of PCIe endpoint.

In another aspect, a PCIe host is provided. The PCIe host includes one or more connection slots configured to be coupled communicatively to one or more PCIe endpoints, respectively. The PCIe host also includes a PCIe link controller communicatively coupled to the one or more connection slots. The PCIe link controller is configured to detect an attached PCIe endpoint on a connection slot among the one or more connection slots. The PCIe link controller is also configured to determine a temporal distance between the PCIe host and the attached PCIe endpoint. When the temporal distance is greater than or equal to a predetermined threshold value, the PCIe link controller is configured to determine the attached PCIe endpoint as a first type of PCIe endpoint and define a first configuration parameter to be provided to the first type of PCIe endpoint. When the temporal distance is less than the predetermined threshold value, the PCIe link controller is configured to determine the attached PCIe endpoint as a second type of PCIe endpoint and define a second configuration parameter, which is different from the first configuration parameter, to be provided to the second type of PCIe endpoint.

DETAILED DESCRIPTION

Figure 1:
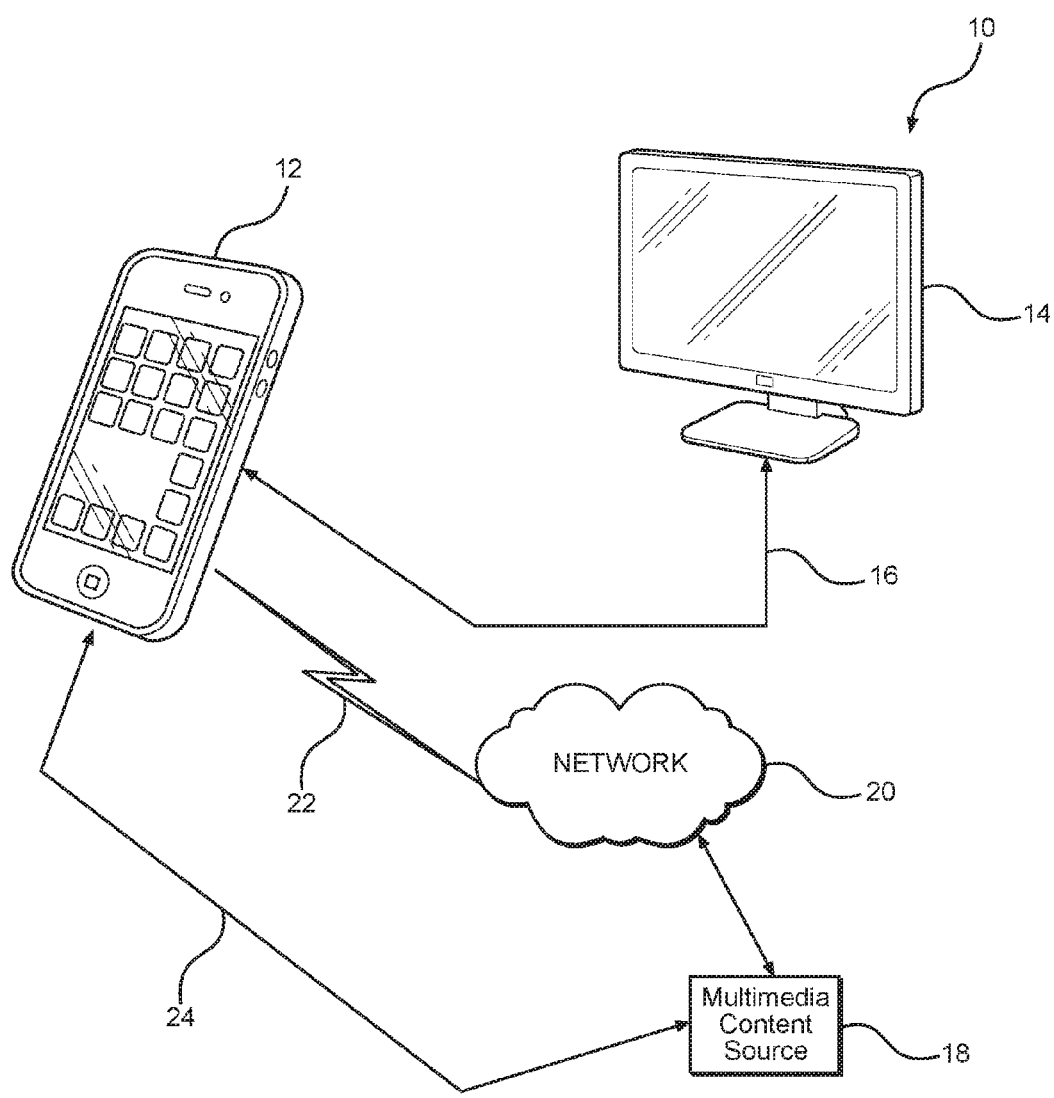
FIG. 1 is a schematic diagram of an exemplary remote display system comprising a mobile communication device configured to render high-definition (HD) multimedia content on a remote display device over a peripheral component interconnect express (PCIe) connection.

With reference now to the drawing figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects.

Aspects disclosed in the detailed description include peripheral component interconnect express (PCIe) hosts adapted to support remote PCIe endpoints. In this regard, a PCIe host is configured to determine a temporal distance to an attached PCIe endpoint and compare the temporal distance to a predetermined threshold value. In one aspect, the PCIe host defines a first configuration parameter for the attached PCIe endpoint if the temporal distance is greater than the predetermined threshold value. In another aspect, the PCIe host defines a second configuration parameter different from the first configuration parameter for the attached PCIe endpoint if the temporal distance is less than or equal to the predetermined threshold value. By differentiating the attached PCIe endpoints based on temporal distances, the PCIe host can support compatibly a plurality of attached PCIe endpoints regardless of physical connection distances with the plurality of attached PCIe endpoints. Before discussing aspects of PCIe hosts adapted to support remote PCIe endpoints, exemplary illustrations of a remote display system based on a PCIe connection and a PCIe protocol flow control mechanism are provided with reference to FIGS. 1 and 2 to provide context for exemplary aspects of the present disclosure and thereby illustrate advantages of exemplary aspects of the present disclosure.

Figure 3:
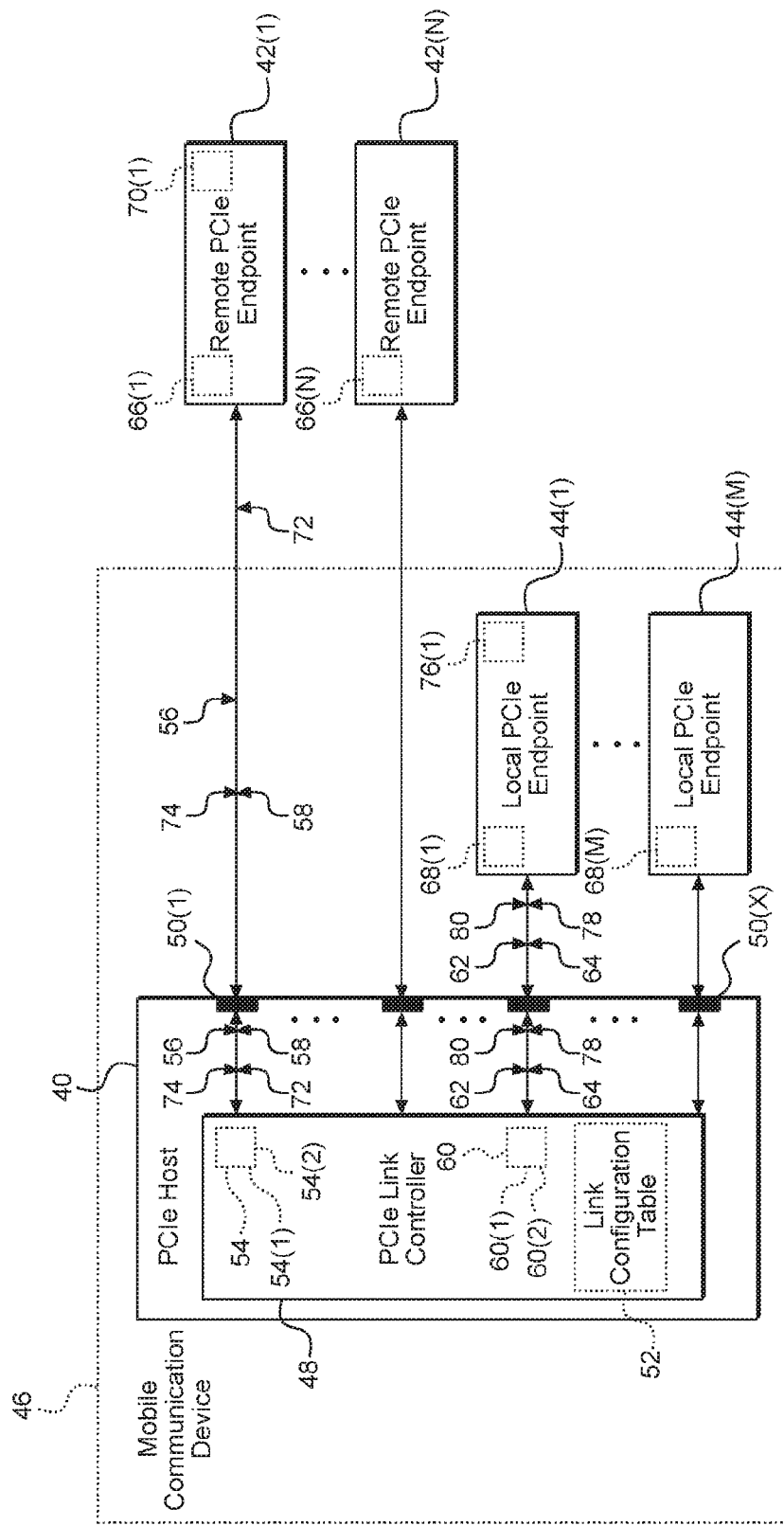
FIG. 3 is a schematic diagram of an exemplary PCIe host configured to differentiate one or more remote PCIe endpoints from one or more local PCIe endpoints and apply a longer transaction layer packet (TLP) Acknowledgement (ACK) timeout value to the one or more remote PCIe endpoints.

The discussion of specific exemplary aspects of PCIe hosts adapted to support remote PCIe endpoints starts in FIG. 3.

In this regard, FIG. 1 is a schematic diagram of an exemplary remote display system 10 comprising a mobile communication device 12 configured to render high-definition (HD) multimedia content on a remote display device 14 over a PCIe connection 16. In the remote display system 10, the mobile communication device 12 is configured as a multimedia source device. The remote display device 14, on the other hand, is configured as a multimedia sink device and is sometimes referred to herein as a remote PCIe endpoint 14. The mobile communication device 12 may be connected to a multimedia content source 18 to receive HD multimedia content. In a non-limiting example, the multimedia content source 18 is at a remote location accessible by the mobile communication device 12 via a wireless network 20 over a wireless communication medium 22. In a non-limiting example, the wireless network 20 may be a wireless wide area network (WWAN) such as a second generation (2G) WWAN, a third generation (3G) WWAN, a fourth generation (4G) WWAN, or a long-term evolution (LTE) WWAN. In another non-limiting example, the wireless network 20 may be a wireless local area network (WLAN). In another non-limiting example, the multimedia content source 18 is nearby the mobile communication device 12 (e.g., an in-home media center) and accessible via a second PCIe connection 24. Given that the PCIe connection 16 is able to provide up to a 32 gigabit-per-second (Gbps) data transmission bandwidth, the mobile communication device 12 can transmit the HD multimedia content to the remote display device 14 without having to apply lossy compression on the HD multimedia content.

Figure 2:
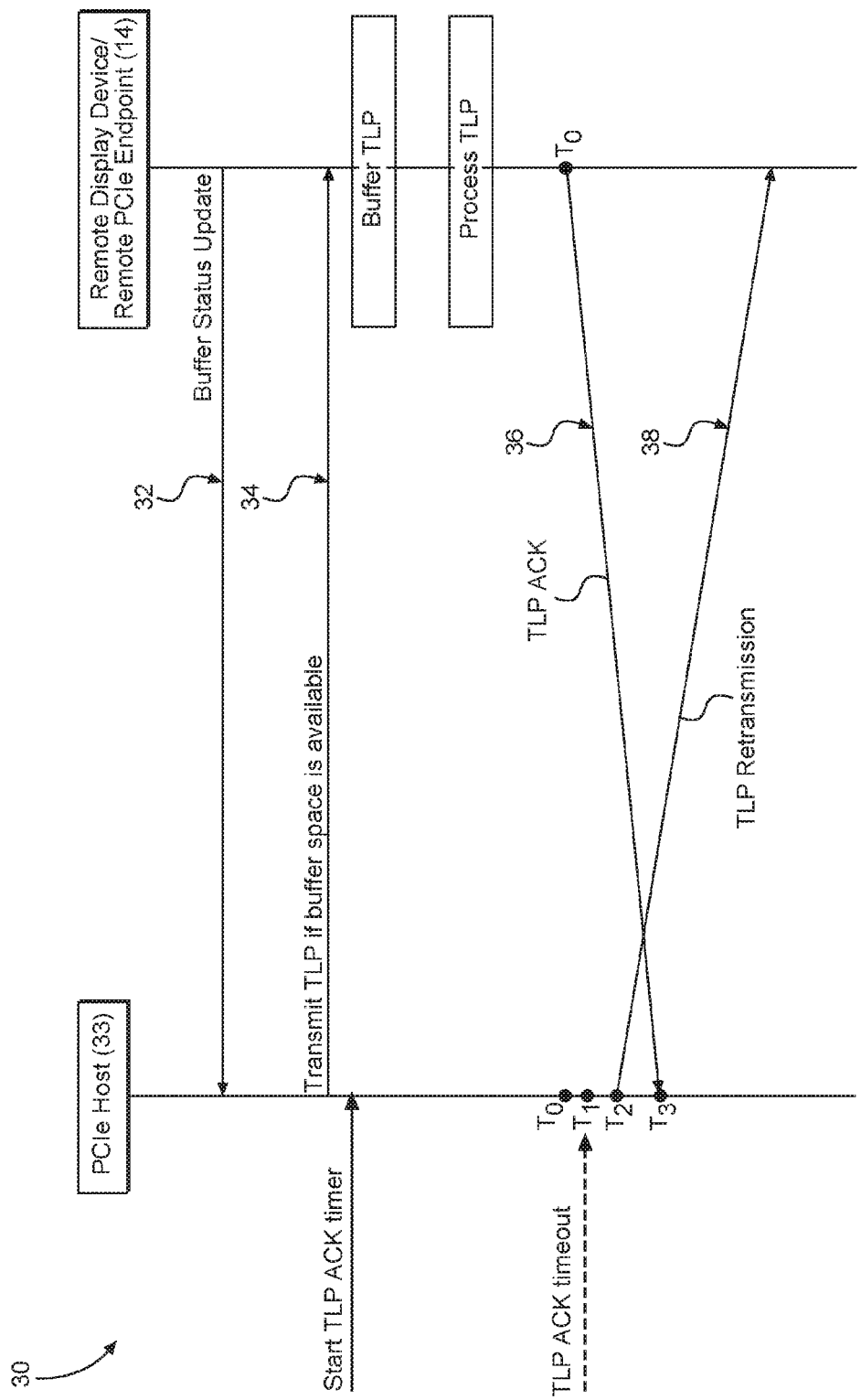
FIG. 2 is an exemplary illustration of a PCIe link level signal flow for providing data flow control and ensuring data integrity on the PCIe connection in FIG. 1.

PCIe utilizes a transmission layer packet (TLP) buffer and TLP retransmission to provide data flow control and ensure data integrity. In this regard, FIG. 2 is an exemplary illustration of a PCIe link level signal flow 30 for providing data flow control and ensuring data integrity on the PCIe connection 16 in FIG. 1. Elements in FIG. 1 are referenced in connection to FIG. 2 and will not be re-described herein.

With reference to FIG. 2, the remote PCIe endpoint 14 is configured to periodically provide a buffer status update 32 to the PCIe host 33. The buffer status update 32 indicates to the PCIe host 33 data buffer space available at the remote PCIe endpoint 14. The PCIe host 33 is configured to only transmit a TLP 34 to the remote PCIe endpoint 14 if the buffer status update 32 indicates available data buffer space at the remote PCIe endpoint 14. In this regard, the PCIe host 33 is obeyed by a data flow control mechanism (not shown) provided by the remote PCIe endpoint 14. Likewise, the PCIe host 33 also enforces data flow control on the remote PCIe endpoint 14 by the same means.

With continuing reference to FIG. 2, upon detecting the available data buffer space at the remote PCIe endpoint 14, the PCIe host 33 transmits the TLP 34 to the remote PCIe endpoint 14 and immediately starts a TLP acknowledge (ACK) timer after the TLP 34 transmission. The TLP 34 is first buffered at the remote PCIe endpoint 14 when arriving at the remote PCIe endpoint 14 and is subsequently processed by the remote PCIe endpoint 14. At time $T_0$, the remote PCIe endpoint 14 transmits a TLP ACK 36 if the TLP 34 is correctly received, or transmits a TLP None ACK (NACK) (not illustrated) if the TLP 34 is incorrectly received. Due to transmission delay associated with the PCIe connection 16 (not shown in FIG. 2), the TLP ACK 36 or the TLP NACK will not arrive at the PCIe host 33 until time $T_3$. However, the TLP ACK timer at the PCIe host 33 may expire at time $T_1$, which is ahead of the arrival time $T_3$ of the TLP ACK 36. Consequently, the PCIe host 33 starts a TLP retransmission 38 prematurely at time $T_2$. If the time misalignment between the TLP 34 and the TLP ACK 36 (or the TLP NACK) persists, the TLP 34 may eventually become undeliverable and have to be discarded.

With continuing reference to FIG. 2, as originally conceived, the PCIe protocol was designed to provide high-speed chip-to-chip interconnections inside the mobile communication device 12. Because transmission delay associated with chip-to-chip interconnection is typically negligible, the PCIe protocol adopts a uniform TLP ACK timeout value across all PCIe connections, including the PCIe connection 16. However, when the PCIe protocol is extended to support the remote PCIe endpoint 14, as illustrated in FIG. 1, the uniform TLP ACK timeout value in the PCIe protocol becomes too short to accommodate the transmission delay associated with the PCIe connection 16. If the uniform TLP ACK timeout value is increased to accommodate the transmission delay associated with the PCIe connection 16, chip-to-chip interconnection throughput will suffer as a result. Accordingly, the PCIe host 33 must provide larger data buffers for the PCIe connection 16 and each chip-to-chip interconnection, thus increasing costs and complexity of the PCIe host 33. Hence, it is desirable for the PCIe host 33 to detect the remote PCIe endpoint 14 and apply a longer TLP ACK timeout value on the PCIe connection 16 to prevent the time misalignment between the TLP 34 and the TLP ACK 36 without impacting chip-to-chip interconnection performance. In this regard, FIG. 3 is a schematic diagram of an exemplary PCIe host 40 configured to differentiate one or more remote PCIe endpoints 42(1)-42(N) from one or more local PCIe endpoints 44(1)-44(M) and apply a longer TLP ACK timeout value to the one or more remote PCIe endpoints 42(1)-42(N).

With reference to FIG. 3, in a non-limiting example, the PCIe host 40 is integrated into a mobile communication device 46. The PCIe host 40 comprises a PCIe link controller 48, which may also be referred to as a means for controlling a PCIe link. In a non-limiting example, the PCIe link controller 48 may be provided as a hardware element or a combination of a hardware element and a software function. The PCIe host 40 also comprises one or more connection slots 50(1)-50(X) (where X≥M+N) configured to be coupled to the one or more remote PCIe endpoints 42(1)-42(N) and/or the one or more local PCIe endpoints 44(1)-44(M). The one or more connection slots 50(1)-50(X) provide a means for communicatively coupling the one or more remote PCIe endpoints 42(1)-42(N) to the PCIe host 40. The PCIe link controller 48 is coupled communicatively to the one or more connection slots 50(1)-50(X). The PCIe link controller 48 is configured to detect an attached PCIe endpoint, which is among the one or more remote PCIe endpoints 42(1)-42(N) or the one or more local PCIe endpoints 44(1)-44(M), through a connection slot among the one or more connection slots 50(1)-50(X).

With continuing reference to FIG. 3, upon detection of the attached PCIe endpoint 42, 44, the PCIe link controller 48 is further configured to determine a temporal distance from the PCIe host 40 to the attached PCIe endpoint 42, 44. In a non-limiting example, the PCIe link controller 48 determines the temporal distance by sending a PCIe flow control packet to the attached PCIe endpoint 42, 44 during PCIe enumeration and measuring a round-trip time of the PCIe flow control packet. In another non-limiting example, the PCIe link controller 48 may also determine the temporal distance to the attached PCIe endpoint 42, 44 by receiving software initiation information from the attached PCIe endpoint 42, 44 during PCIe enumeration. After determining the temporal distance to the attached PCIe endpoint 42, 44, the PCIe link controller 48 compares the temporal distance to a predetermined threshold value. If the temporal distance is greater than the predetermined threshold value, the attached PCIe endpoint is determined as a first type of PCIe endpoint, which is a remote PCIe endpoint 42 of the one or more remote PCIe endpoints 42(1)-42(N) in a non-limiting example. If the temporal distance is less than or equal to the predetermined threshold value, the attached PCIe endpoint is determined as a second type of PCIe endpoint, which is a local PCIe endpoint 44 of the one or more local PCIe endpoints 44(1)-44(M) in a non-limiting example.

With continuing reference to FIG. 3, the PCIe link controller 48 is also configured to define a first configuration parameter for the first type of PCIe endpoint 42. In a non-limiting example, the first configuration parameter is a first timeout value for the attached PCIe endpoint 42, 44, which is determined as the first type of PCIe endpoint 42 or the one or more remote PCIe endpoints 42(1)-42(N). The PCIe link controller 48 is further configured to define a second configuration parameter, which is different from the first configuration parameter, for the second type of PCIe endpoint 44. In another non-limiting example, the second configuration parameter is a second timeout value shorter than the first timeout value for the attached PCIe endpoint 42, 44, which is determined as the second type of PCIe endpoint 44 or the one or more local PCIe endpoints 44(1)-44(M).

With continuing reference to FIG. 3, the PCIe link controller 48 is further configured to store the first configuration parameter (e.g., the first timeout value) and the second type of configuration parameter (e.g., the second timeout value) in a link configuration table 52. In a non-limiting example, the PCIe link controller 48 comprises a remote transmission control element 54 comprising a first host timer 54(1) and a first host data buffer 54(2). The first host data buffer 54(2) has a first buffer size (not shown) corresponding to the first timeout value. The PCIe link controller 48 starts the first host timer 54(1), which corresponds to the remote PCIe endpoint 42(1), according to the first timeout value stored in the link configuration table 52 immediately after transmitting a first host-originated TLP 56 to the remote PCIe endpoint 42(1). The PCIe link controller 48 is configured to retransmit the first host-originated TLP 56 to the remote PCIe endpoint 42(1) if a first endpoint-originated ACK 58 is not received from the remote PCIe endpoint 42(1) when the first host timer 54(1) expires. In another non-limiting example, the PCIe link controller 48 also comprises a local transmission control element 60 comprising a second host timer 60(1) and a second host data buffer 60(2). The second host data buffer 60(2) has a second buffer size (not shown), which is smaller than the first buffer size, corresponding to the second timeout value that is shorter than the first timeout value. The PCIe link controller 48 starts the second host timer 60(1), which corresponds to the local PCIe endpoint 44(1), according to the second timeout value stored in the link configuration table 52 immediately after transmitting a second host-originated TLP 62 to the local PCIe endpoint 44(1). The PCIe link controller 48 is configured to retransmit the second host-originated TLP 62 to the local PCIe endpoint 44(1) if a second endpoint-originated ACK 64 is not received from the local PCIe endpoint 44(1) when the second host timer 60(1) expires.

With continuing reference to FIG. 3, the PCIe link controller 48 is configured to provide the first configuration parameter (e.g., the first timeout value) to the one or more remote PCIe endpoints 42(1)-42(N). The one or more remote PCIe endpoints 42(1)-42(N) are configured to store the first configuration parameter in one or more remote endpoint configuration tables 66(1)-66(N), respectively. The PCIe link controller 48 is also configured to provide the second configuration parameter (e.g., the second timeout value) to the one or more local PCIe endpoints 44(1)-44(M). The one or more local PCIe endpoints 44(1)-44(M) are configured to store the second configuration parameter in one or more local endpoint configuration tables 68(1)-68(M), respectively. In a non-limiting example, the remote PCIe endpoint 42(1) starts a first endpoint timer 70(1) according to the first timeout value stored in the remote endpoint configuration table 66(1) immediately after transmitting a first endpoint-originated TLP 72 to the PCIe link controller 48. The remote PCIe endpoint 42(1) is configured to retransmit the first endpoint-originated TLP 72 to the PCIe link controller 48 if a first host-originated ACK 74 is not received from the PCIe link controller 48 when the first endpoint timer 70(1) expires. In another non-limiting example, the local PCIe endpoint 44(1) starts a second endpoint timer 76(1) according to the second timeout value stored in the local endpoint configuration table 68(1) immediately after transmitting a second endpoint-originated TLP 78 to the PCIe link controller 48. The local PCIe endpoint 44(1) is configured to retransmit the second endpoint-originated TLP 78 to the PCIe link controller 48 if a second host-originated ACK 80 is not received from the PCIe link controller 48 when the second endpoint timer 76(1) expires.

With continuing reference to FIG. 3, by associating the one or more remote PCIe endpoints 42(1)-42(N) with a longer timeout value and a larger data buffer, the PCIe host 40 is able to effectively prevent the time misalignment between the TLP 34 and the TLP ACK 36 as previously illustrated in reference to FIG. 2. Further, by associating the one or more local PCIe endpoints 44(1)-44(M) with a shorter timeout value and a smaller data buffer, the PCIe host 40 is able to provide the high-speed chip-to-chip interconnections inside the mobile communication device 12.

Figure 4:
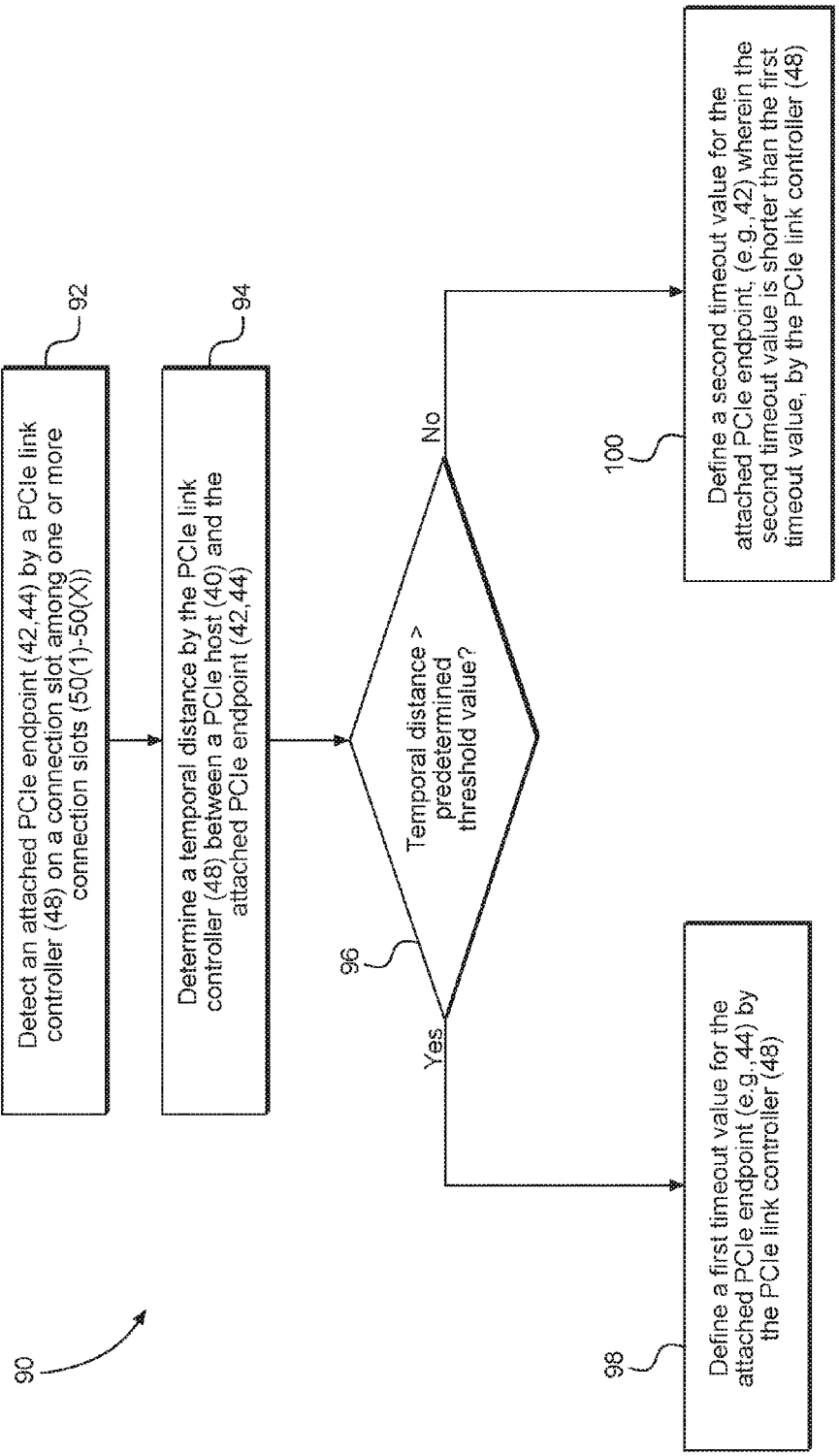
FIG. 4 is a flowchart of an exemplary PCIe host process for supporting a remote PCIe endpoint among one or more remote PCIe endpoints.

FIG. 4 is a flowchart of an exemplary PCIe host process 90 for supporting a remote PCIe endpoint 42 among the one or more remote PCIe endpoints 42(1)-42(N) in FIG. 3. Elements in FIG. 3 are referenced in connection with FIG. 4 and will not be re-described herein.

With reference to FIG. 4, the PCIe host process 90 includes detecting an attached PCIe endpoint by the PCIe link controller 48 on a connection slot among the one or more connection slots 50(1)-50(X) (block 92). Next, the PCIe link controller 48 determines a temporal distance between the PCIe host 40 and the attached PCIe endpoint 42, 44 (block 94). Subsequently, the PCIe link controller 48 compares the temporal distance with a predetermined threshold value (block 96). If the temporal distance is greater than the predetermined threshold value, the PCIe link controller 48 defines the first timeout value for the attached PCIe endpoint (e.g., PCIe endpoint 44) (block 98). If the temporal distance is less than or equal to the predetermined threshold value, the PCIe link controller 48 defines the second timeout value for the attached PCIe endpoint (e.g., PCIe endpoint 42) that is shorter than the first timeout value (block 100).

The PCIe hosts adapted to support remote PCIe endpoints 42(1)-42(N) and 44(1)-44(N) according to aspects disclosed herein may be provided in or integrated into any processor-based device. Examples, without limitation, include a set top box, an entertainment unit, a navigation device, a communications device, a fixed location data unit, a mobile location data unit, a mobile phone, a cellular phone, a computer, a portable computer, a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, and a portable digital video player.

Figure 5:
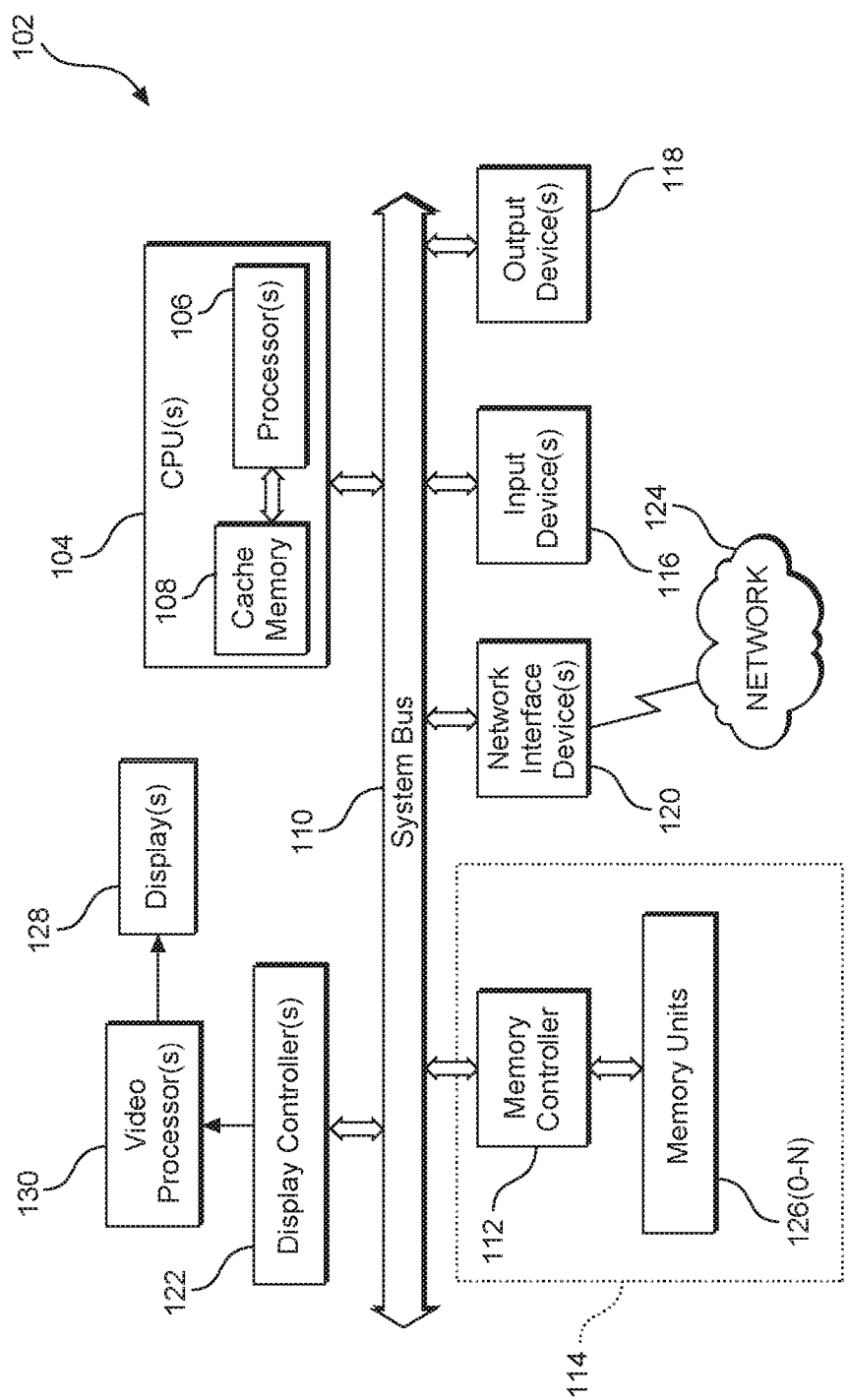
FIG. 5 illustrates an example of a processor-based system that can employ the PCIe host illustrated in FIG. 3.

In this regard, FIG. 5 illustrates an example of a processor-based system 102 that can employ the PCIe host 40 illustrated in FIG. 3. In this example, the processor-based system 102 includes one or more central processing units (CPUs) 104, each including one or more processors 106. The CPU(s) 104 may have cache memory 108 coupled to the processor(s) 106 for rapid access to temporarily stored data. The CPU(s) 104 is coupled to a system bus 110. As is well known, the CPU(s) 104 communicates with these other devices by exchanging address, control, and data information over the system bus 110. For example, the CPU(s) 104 can communicate bus transaction requests to a memory controller 112. Although not illustrated in FIG. 5, multiple system buses 110 could be provided, wherein each system bus 110 constitutes a different fabric.

In a non-limiting example, the PCIe host 40 of FIG. 3 is provided in the CPU(s) 104 of FIG. 5. The system bus 110 is configured to provide the one or more connection slots 50(1)-50(X) (not shown in FIG. 5). Other devices can be connected to the system bus 110 via the one or more connection slots 50(1)-50(X). As illustrated in FIG. 5, these devices can include a memory system 114, one or more input devices 116, one or more output devices 118, one or more network interface devices 120, and one or more display controllers 122, as examples. In this regard, the memory system 114, the one or more input devices 116, the one or more output devices 118, the one or more network interface devices 120, and the one or more display controllers 122 are among the one or more local PCIe endpoints 44(1)-44(M) in FIG. 3. The input device(s) 116 can include any type of input device, including but not limited to input keys, switches, voice processors, etc. The output device(s) 118 can include any type of output device, including but not limited to audio, video, other visual indicators, etc. The network interface device(s) 120 can be any device configured to allow exchange of data to and from a network 124. The network 124 can be any type of network, including but not limited to a wired or wireless network, a private or public network, a local area network (LAN), a wireless local area network (WLAN), a BLUETOOTH network, a wide area network (WAN), or the Internet. The network interface device(s) 120 can be configured to support any type of communication protocol desired. The memory system 114 can include one or more memory units 126(0-N).

The CPU(s) 104 may also be configured to access the display controller(s) 122 over the system bus 110 to control information sent to one or more displays 128. The display controller(s) 122 sends information to the display(s) 128 to be displayed via one or more video processors 130, which process the information to be displayed into a format suitable for the display(s) 128. The one or more video processors 130 may be configured to function as the PCIe host 40 in FIG. 3 and support the display(s) 128 through the one or more connection slots 50(1)-50(X) in FIG. 3. The display(s) 128 can include any type of display, including but not limited to a cathode ray tube (CRT), a liquid crystal display (LCD), a plasma display, etc.

Those of skill in the art will further appreciate that the various illustrative logical blocks, modules, circuits, and algorithms described in connection with the aspects disclosed herein may be implemented as electronic hardware, instructions stored in memory or in another computer-readable medium and executed by a processor or other processing device, or combinations of both. The master devices and slave devices described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The aspects disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flowchart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A peripheral component interconnect express (PCIe) host comprising:
    one or more connection slots configured to be coupled communicatively to one or more PCIe endpoints, respectively; and
    a PCIe link controller communicatively coupled to the one or more connection slots, wherein the PCIe link controller is configured to:
        detect an attached PCIe endpoint on a connection slot among the one or more connection slots;
        determine a temporal distance between the PCIe host and the attached PCIe endpoint by measuring a round-trip time of a PCIe flow control packet; and
        when the temporal distance is greater than a predetermined threshold value:
            determine the attached PCIe endpoint as a first type of PCIe endpoint; and
            define a first configuration parameter to be provided to the first type of PCIe endpoint.

2. The PCIe host of claim 1, wherein:
    the first configuration parameter is a first timeout value.

3. The PCIe host of claim 1, wherein the PCIe link controller is further configured to determine the temporal distance by measuring the round-trip time of the PCIe flow control packet during PCIe enumeration.

4. The PCIe host of claim 1, wherein the PCIe link controller is further configured to determine the temporal distance by receiving software initiation information from the attached PCIe endpoint during PCIe enumeration.

5. The PCIe host of claim 2, wherein:
    the first type of PCIe endpoint is a remote PCIe endpoint.

6. The PCIe host of claim 5, wherein the PCIe link controller is configured to:
    store the first timeout value in a link configuration table; and
    provide the first timeout value to the remote PCIe endpoint.

7. The PCIe host of claim 6, wherein the remote PCIe endpoint is configured to store the first timeout value received from the PCIe link controller in a remote endpoint configuration table.

8. The PCIe host of claim 7, wherein the PCIe link controller is further configured to:
    retransmit a first host-originated transaction layer packet (TLP) to the remote PCIe endpoint if a first endpoint-originated acknowledgement (ACK) for the first host-originated TLP is not received from the remote PCIe endpoint when a first host timer set according to the first timeout value expires.

9. The PCIe host of claim 8, wherein:
    the remote PCIe endpoint is configured to retransmit a first endpoint-originated TLP to the PCIe link controller if a first host-originated ACK for the first endpoint-originated TLP is not received from the PCIe link controller when a first endpoint timer set according to the first timeout value expires.

10. A peripheral component interconnect express (PCIe) host comprising:
    one or more connection slots configured to be coupled communicatively to one or more PCIe endpoints, respectively; and
    a PCIe link controller communicatively coupled to the one or more connection slots, wherein the PCIe link controller is configured to:
        detect an attached PCIe endpoint on a connection slot among the one or more connection slots;
        determine a temporal distance between the PCIe host and the attached PCIe endpoint;
        when the temporal distance is greater than or equal to a predetermined threshold value:
            determine the attached PCIe endpoint as a first type of PCIe endpoint; and
            define a first configuration parameter to be provided to the first type of PCIe endpoint; and
        when the temporal distance is less than the predetermined threshold value:
            determine the attached PCIe endpoint as a second type of PCIe endpoint; and
            define a second configuration parameter, which is different from the first configuration parameter, to be provided to the second type of PCIe endpoint.

* * * * *